(12) United States Patent
Imaizumi et al.

(10) Patent No.: US 7,458,185 B2
(45) Date of Patent: Dec. 2, 2008

(54) BELT MOLDING STRUCTURE FOR MOTOR VEHICLES

(75) Inventors: Hirotaka Imaizumi, Kanagawa-ken (JP); Junsuke Tanaka, Kanagawa-ken (JP)

(73) Assignees: Shiroki Corporation, Kanagawa-Ken (JP); Nissan Motor Co., Ltd, Kanagawa-Ken (JP)

( * ) Notice: Subject to any disclaimer, the term of this patent is extended or adjusted under 35 U.S.C. 154(b) by 629 days.

(21) Appl. No.: 11/076,519

(22) Filed: Mar. 10, 2005

(65) Prior Publication Data

US 2005/0198908 A1 Sep. 15, 2005

(30) Foreign Application Priority Data

Mar. 10, 2004 (JP) ............................. 2004-067025

(51) Int. Cl.
*E06B 7/16* (2006.01)
(52) U.S. Cl. .......................................... 49/377; 49/440
(58) Field of Classification Search .................... 49/374, 49/376, 377; 296/146.2, 146.9, 146.16
See application file for complete search history.

(56) References Cited

U.S. PATENT DOCUMENTS 7,055,291 B2 * 6/2006 Nakanishi et al. .......... 52/716.5

2007/0278830 A1 * 12/2007 Nakao et al. ........... 296/203.01

FOREIGN PATENT DOCUMENTS

| EP | 482999 A1 * | 4/1992 |
| JP | 5-28720 | 4/1993 |
| JP | 2005238964 A * | 9/2005 |

* cited by examiner

*Primary Examiner*—Katherine W Mitchell
*Assistant Examiner*—Michael J Keller
(74) *Attorney, Agent, or Firm*—Millen, White, Zelano & Branigan, P.C.

(57) ABSTRACT

A belt molding structure for motor vehicles includes a molding body including a resiliently-deformable anti-vibration lip which is integrally formed on an inner surface of the molding body; an end cap attachable to an end of the molding body, and including an insertion portion; a lip-escape space, provided inside the molding body so as not to interfere with the insertion portion of the end cap, for allowing at least a portion of the anti-vibration lip to come into the lip-escape space when the anti-vibration lip is deformed; and a deforming guide surface formed on the end cap in a vicinity of an insertion end of the insertion portion to resiliently deform the anti-vibration lip into the lip-escape space when the insertion portion is inserted into the molding body.

10 Claims, 7 Drawing Sheets

Prior Art

Prior Art

BELT MOLDING STRUCTURE FOR MOTOR VEHICLES

BACKGROUND OF THE INVENTION

1. Field of the Invention

The present invention relates to a belt molding structure for motor vehicles, particularly to an improved structure of an end of the belt molding at which an end cap is fixed.

2. Description of the Related Art

FIGS. 9 through 11 show an example of conventional window belt molding (window waist molding) which is fixed to a motor vehicle door. As shown in FIG. 9, a front side door 50 and a rear side door 51 are provided along lower window edges thereof with a window belt molding 52 and a window belt molding 53, respectively. FIG. 10 shows a cross sectional view of each of these window belt moldings 52 and 53. An outer door panel of each side door 50 and 51 has a flange portion (hemmed edge, upper edge) 55 along the lower window edge of the door, and a molding body 56 of each window belt molding 52 and 53 has a C-shaped cross section (a cross section of a channel) surrounding the flange portion 55. An end cap 60 is fitted into an end of the molding body 56 for the purpose of enhancing the appearance of the end of the molding body 56 and covering sharp edges of the end of the molding body for safety. Two weather strips 57, both of which come in contact with an outer surface of a car window (window glass) are formed integral with the molding body 56 to project toward the car window from an inner wall portion (portion facing the interior side of the vehicle) 56a of the molding body 56, while a resiliently-deformable anti-vibration lip 58 is formed integral with the molding body 56 to project from an inner surface of a decorative wall portion 56b positioned outside the vehicle. The anti-vibration lip 58 is in pressing contact with the flange portion 55 to prevent the molding body 56 from leaning (slanting) toward the interior side of the vehicle (leftward as viewed in FIG. 10). This type of molding body including such an anti-vibration lip is disclosed in Japanese utility model patent No. 2591409.

The anti-vibration lip 58 is provided at the same position as the end cap 60 in the direction of insertion of the end cap 60 into a corresponding end of the molding body 56. Therefore, at the corresponding end of the molding body 56, an associated end (end portion A' to be removed) of the anti-vibration lip 58 is removed to correspond to a length A of an insertion portion 60a of the end cap 60 as shown in FIG. 11 to prevent the end cap 60 and the anti-vibration lip 58 from interfering with each other. However, cutting out such a part of the anti-vibration lip 58 from the molding body 56 is troublesome and time-consuming.

It is conceivable to reduce the amount of projection of the anti-vibration lip 58 in order to prevent the end cap 60 and the anti-vibration lip 58 from interfering with each other. However, if the amount of projection of the anti-vibration lip 58 is reduced, the original function of the anti-vibration lip 58, which is to support the window belt molding with stability, may deteriorate. It is also conceivable to provide the end cap 60 with a clearance recess for the anti-vibration lip 58 by cutting out the entire portion of the insertion portion 60a in the direction of insertion of the end cap 60 which would otherwise interfere with the anti-vibration lip 58. However, if the end cap 60 is provided with such a clearance recess, the wall thickness of the whole insertion portion 60a of the end cap 60 becomes small to thereby make it difficult to ensure sufficient strength of the end cap 60, or the insertion portion 60a may increase in size by an amount corresponding to the amount of formation of the clearance recess, which may deteriorate the appearance of the window belt molding.

SUMMARY OF THE INVENTION

The present invention has been devised in view of the problems mentioned above, and provides an improved belt molding structure for motor vehicles which is superior to conventional belt molding structures in productivity, in stability using the anti-vibration lip, in workability of fitting the end cap into an end of a belt molding, and in decorative design.

According to an aspect of the present invention, a belt molding structure for motor vehicles is provided, including a molding body which is attachable to an upper edge of a door panel, the molding body including a resiliently-deformable anti-vibration lip which is integrally formed on an inner surface of the molding body to be capable of being in resilient contact with the door panel; an end cap which is attachable to an end of the molding body, the end cap including an insertion portion which is inserted into the molding body from the end of the molding body; a lip-escape space, provided inside the molding body so as not to interfere with the insertion portion of the end cap, for allowing at least a portion of the anti-vibration lip to come into the lip-escape space when the anti-vibration lip is deformed; and a deforming guide surface formed on the end cap in a vicinity of an insertion end of the insertion portion to resiliently deform the anti-vibration lip into the lip-escape space in accordance with a movement of the insertion portion into the molding body when the insertion portion is inserted into the molding body.

It is desirable for the insertion portion of the end cap to further include a holding surface for holding the anti-vibration lip, which is deformed by the deforming guide surface, in a deformed state.

It is desirable for the deforming guide surface and the holding surface to be aligned in the insertion direction, the deforming guide surface being formed as a cut-out portion having an inclined surface, at the insertion end of the insertion portion of the end cap, so that the inclined surface is open at the insertion end.

It is desirable for the deforming guide surface to be formed as a recess in the shape of an inner surface of a substantially half truncated-cone cut in half along the insertion direction, the radius of which increases from the insertion end toward an opposite end of the insertion portion in the insertion direction.

It is desirable for the molding body to include at least one weather strip which comes in contact with a car window of the door panel.

It is desirable for the lip-escape space to be provided immediately above the anti-vibration lip.

It is desirable for the depth of the recess that forms the deforming guide surface to decrease from the insertion end toward an opposite end of the insertion portion in the insertion direction.

It is desirable for the anti-vibration lip to remain in resilient contact with the holding surface in a state where the insertion portion is fully inserted into the molding body.

In an embodiment, a belt molding structure for motor vehicles which includes a molding body and an end cap having an insertion portion which is inserted into the molding body from an end of the molding body is provided, wherein the molding body includes a resiliently-deformable anti-vibration lip which projects from an inner surface of the molding body to be capable of being in resilient contact with a door panel; and a lip-escape space, provided inside the molding body so as not to interfere with the insertion portion of the end cap, for allowing at least a portion of the anti-vibration lip to come into the lip-escape space when the anti-vibration lip is deformed; and wherein the end cap includes an end guard portion from which the insertion portion projects, the end guard portion covering the end of the molding body in a state where the insertion portion is fully inserted into the molding body; and a deforming guide surface formed on the insertion portion in a vicinity of an insertion end thereof in a direction of insertion of the end cap into the molding body to resiliently deform the anti-vibration lip into the lip-escape space in accordance with a movement of the insertion portion into the molding body when the insertion portion is inserted into the molding body.

According to the present invention, no part of the molding body has to be removed in the vicinity of an insertion end thereof, into which the end cap is fitted, because the anti-vibration lip retreats in accordance with the movement of the end cap into the insertion end of the molding body when the end cap is fitted into the insertion end of the molding body. This improves productivity without loss of the workability of inserting the end cap into the corresponding end of the molding body. In addition, the stability of the molding body is not impaired because a sufficient amount of projection of the anti-vibration lip can be secured without no limits imposed by the end cap. Moreover, the end cap has a high degree of flexibility in shape because the end cap does not have to be provided with a clearance recess or the like for the anti-vibration lip. Furthermore, the end cap can be held at the corresponding end of the molding body by bringing the anti-vibration lip into pressing contact with the end cap, thus also being superior in functionality.

The present disclosure relates to subject matter contained in Japanese Patent Application No. 2004-067025 (filed on Mar. 10, 2004) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

An embodiment of a belt molding structure according to the present invention which is applied to a window belt molding similar to that shown in FIG. 9 will be discussed hereinafter. Note that such expressions as "upward", "downward", "inside of the vehicle" and "outside of the vehicle" in the following description are noted with reference to an outer door panel of a motor vehicle to which the present embodiment of the window belt molding is fixed.

Figure 1:
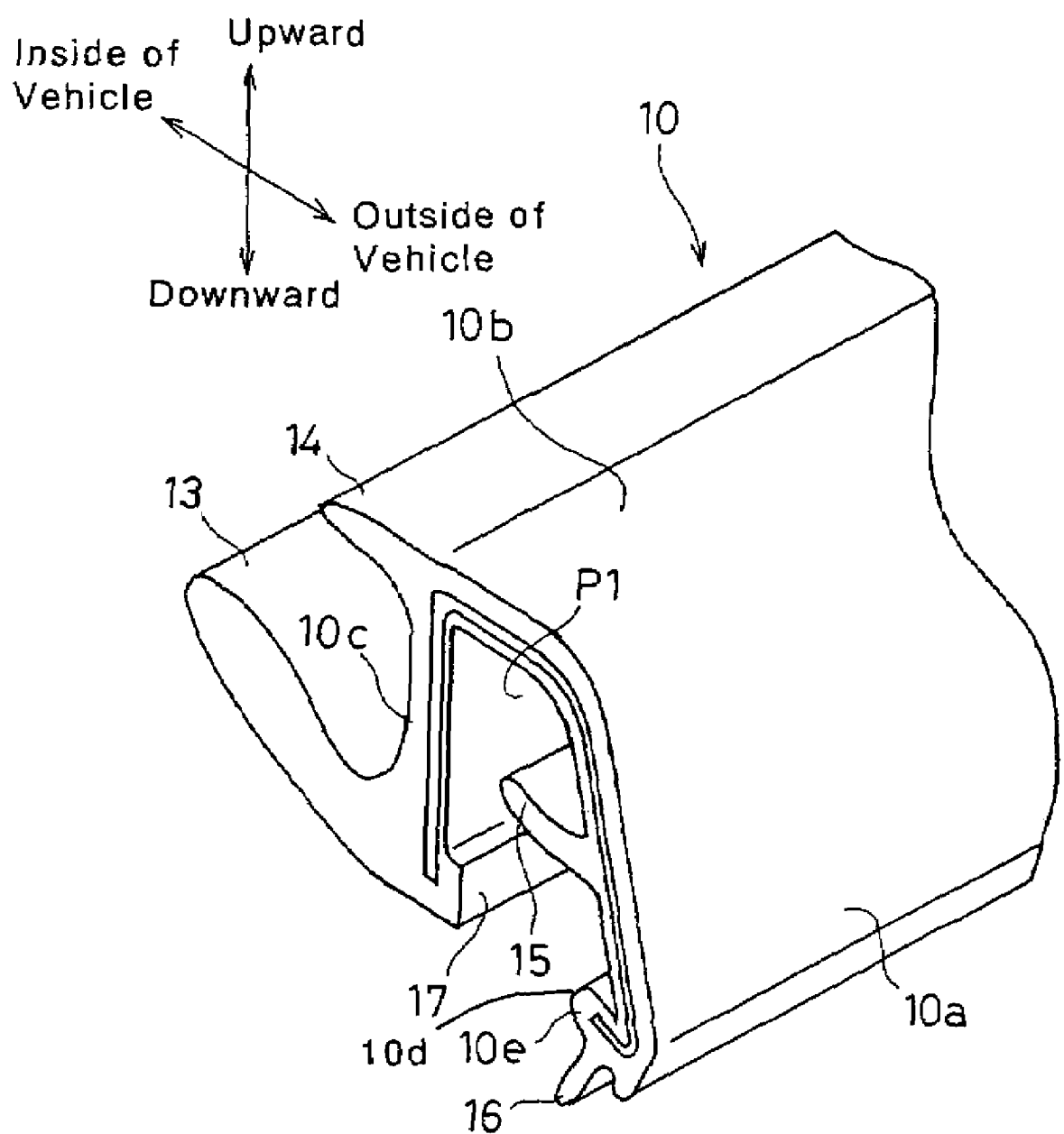
FIG. 1 is a perspective view of an end portion of a molding body which serves as an element of an embodiment of a belt molding structure for motor vehicles according to the present invention.
Figure 2:
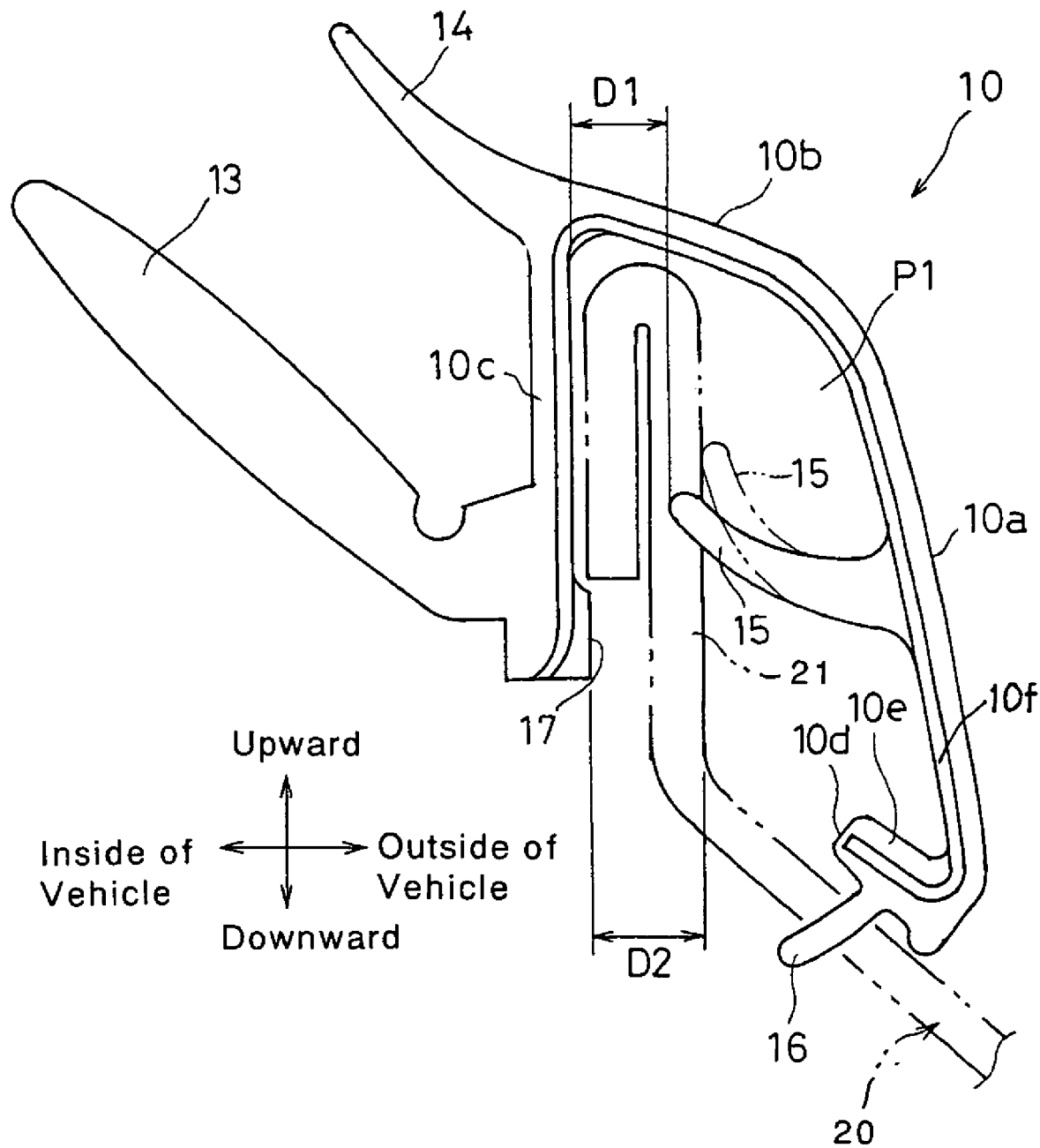
FIG. 2 is a front elevational view of an end surface of the molding body shown in FIG. 1.

FIGS. 1 and 2 show a cross sectional shape of a molding body 10 which serves as an element of the window belt molding. The molding body 10 is composed of a metal base 10f which is shaped by roll forming, and a synthetic resin or rubber jacket which covers the metal base 10f. The molding body 10 has a substantially C-shape cross section (cross section of a channel), and is provided with a first decorative flat portion 10a and a second decorative flat portion (upper decorative flat portion) 10b, both of which are positioned to face toward the outside of the vehicle in different directions, and is further provided with an inside wall portion 10c which is positioned to face toward the inside of the vehicle, and a bottom opening 10d which is formed at a position on the opposite side of the first decorative flat portion 10a with respect to the second decorative flat portion 10b. The border between the first decorative flat portion 10a and the second decorative flat portion (upper decorative flat portion) 10b is gently curved so that the outer surface of the border is formed in a smooth curved surface. The molding body 10 is provided, on the inside wall portion 10c at a lower edge thereof, with a weather strip 13, and is further provided, on the inside wall portion 10c at an upper edge thereof, with a water-seal lip (weather strip) 14 which is shorter than the weather strip 13 in the lateral direction thereof (i.e., in a direction toward the inside of the vehicle). The water-seal lip 14 is shaped to project toward the inside of the vehicle from the second decorative flat portion 10b in a direction substantially parallel to the weather strip 13. Each of the weather strip 13 and the water-seal lip 14 is formed integral with the jacket of the molding body 10, and has resiliency. The weather strip 13 is resiliently deformed in a direction toward the water-seal lip 14 to exhibit a water-seal capability when brought into resilient contact with an associated car window.

The first decorative flat portion 10a is provided at an edge (lower edge) thereof opposite from the second decorative flat portion 10b with an inwardly projecting edge portion 10e which is formed so that a portion of the first decorative flat portion 10a bends inwardly in the vicinity of the lower edge thereof. The inwardly projecting edge portion 10e is substantially parallel to the second decorative flat portion 10b and is provided at a position on the opposite edge (i.e., the lower edge) of the first decorative flat portion 10a with respect to the second decorative flat portion 10b. An auxiliary anti-vibration lip 16 projects obliquely downwards from the inwardly projecting edge portion 10e. The inside wall portion 10c is provided, on an inner surface thereof in the vicinity of the lower end of the inside wall portion 10c, with a guide rib 17 which projects toward the inside of the molding body 10. The guide rib 17 has a uniform cross sectional shape at any position along the lengthwise direction of the molding body 10.

The molding body 10 is provided, on an inner surface of the first decorative flat portion 10a at a substantially central portion thereon between the second decorative flat portion 10b and the inwardly projecting edge portion 10e, with an anti-vibration lip 15 which projects in a direction to approach the inside wall portion 10c. The anti-vibration lip 15 projects in a direction substantially parallel to the second decorative flat portion 10b, and has a cross sectional shape which is slightly curved so that a lower surface of the anti-vibration lip 15 has a convex surface. The anti-vibration lip 15 has resiliency, and a gap D1 (see FIG. 2) is formed between the tip of the anti-vibration lip 15 and an inner surface of the inside wall portion 10c when the anti-vibration lip 15 is in a free state. The molding body 10 is provided on the inner sides of the first decorative flat portion 10a and the second decorative flat portion 10b with a lip-escape space P1 for allowing at least a part of the anti-vibration lip 15 to come into the lip-escape space P1 when the anti-vibration lip 15 is resiliently deformed.

Figure 9:
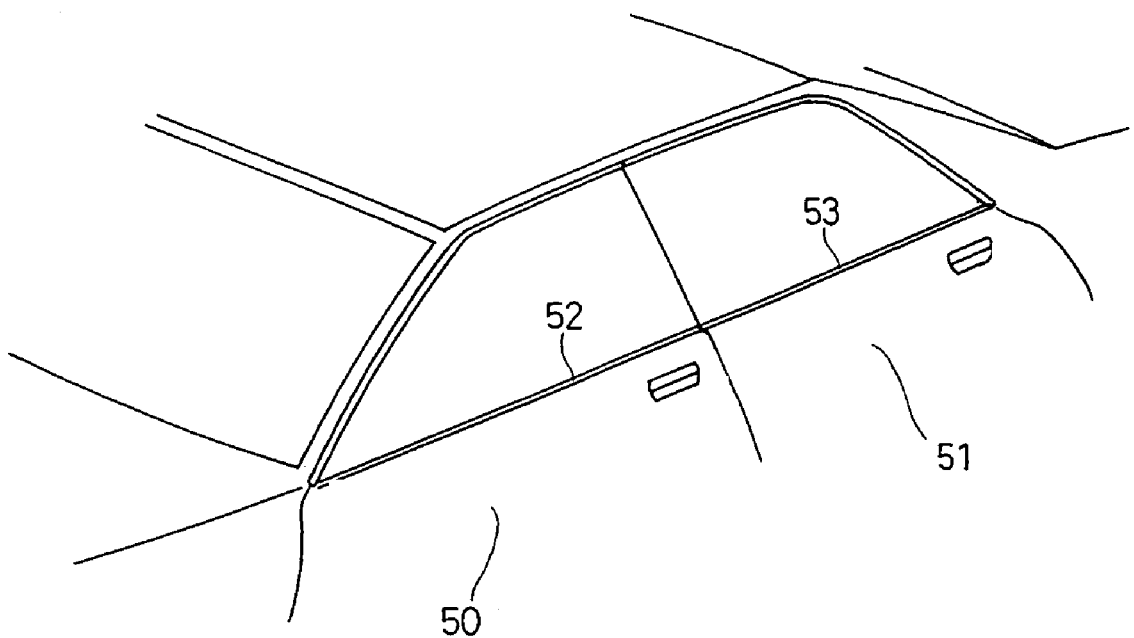
FIG. 9 is a perspective view of a left side portion of a car body, showing conventional window belt moldings fixed to side doors of the car body.
Figure 10:
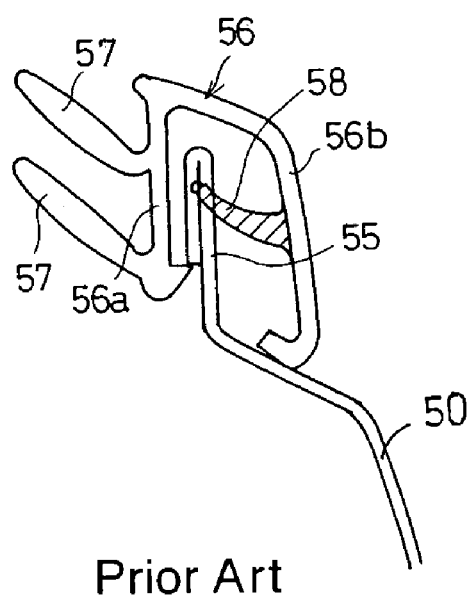
FIG. 10 is a cross sectional view of each conventional window belt molding shown in FIG. 9.
Figure 11:
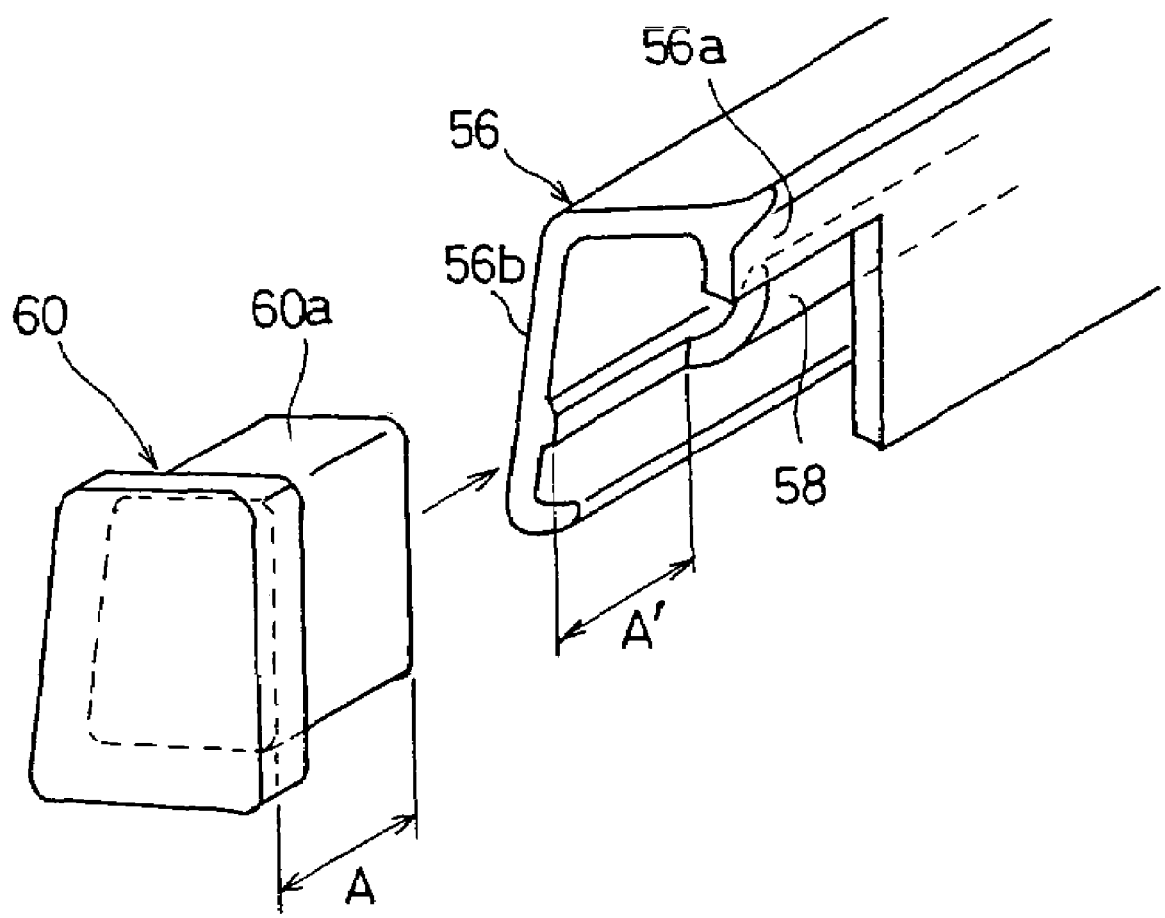
FIG. 11 is an exploded perspective view of an end portion of each conventional window belt molding shown in FIG. 9, showing the structure of the end portion.

When the molding body 10 is installed on an outer door panel 20 of a motor vehicle (which corresponds to each of the outer door panels 50 and 51 shown in FIG. 9), the molding body 10 is fixed to a flange portion (hemmed edge, upper edge) 21 (which corresponds to the flange portion 55 shown in FIG. 10) of the outer door panel 20 by inserting the flange portion 21 into the molding body 10 through the bottom opening 10d. In a fixed state of the molding body 10 to the flange portion 21, an inside surface (left-handed surface as viewed in FIG. 2) of the flange portion 21 in the vicinity of the upper end thereof is in contact with the inside wall portion 10c while an outer surface of the outer door panel 20 immediately below the flange portion 21 is in contact with the inwardly projecting edge portion 10e (via the auxiliary anti-vibration lip 16) to thereby fix the position of the molding body 10 relative to the flange portion 21 in the lateral direction with respect to FIG. 2. In addition, the position of the molding body 10 relative to the flange portion 21 in the vertical direction with respect to FIG. 2 is fixed by the engagement of the inwardly projecting edge portion 10e with the aforementioned outer surface of the outer door panel 20 immediately below the flange portion 21 and the engagement of the guide rib 17 with the flange portion 21. A thickness D2 of the flange portion 21 in the vicinity of the upper end thereof is greater than the gap D1 between the tip of the anti-vibration lip 15 and an inner surface of the inside wall portion 10c, and accordingly the anti-vibration lip 15 is resiliently deformed so as to be lifted upwards, toward the lip-escape space P1, in a manner as shown by two-dot chain line in FIG. 2. The resiliency of the anti-vibration lip 15 when deformed in such a manner causes the anti-vibration lip 15 to be pressed against the flange portion 21, so that the position of the molding body 10 relative to the flange portion 21 becomes stable to thereby prevent the molding body 10 from rattling and tilting relative to the flange portion 21.

Figure 4:
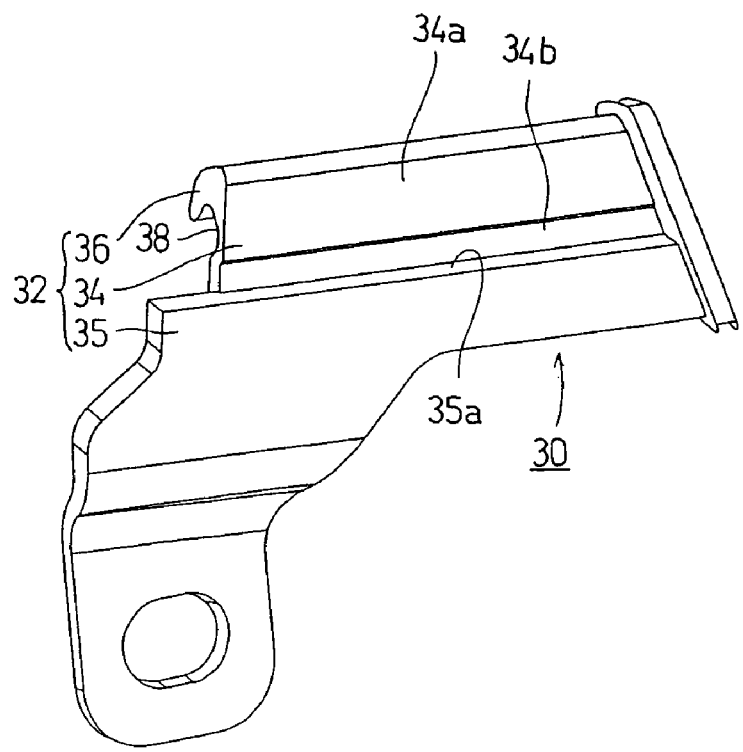
FIG. 4 is a perspective view of the end cap shown in FIG. 3, viewed from a different angle.
Figure 5:
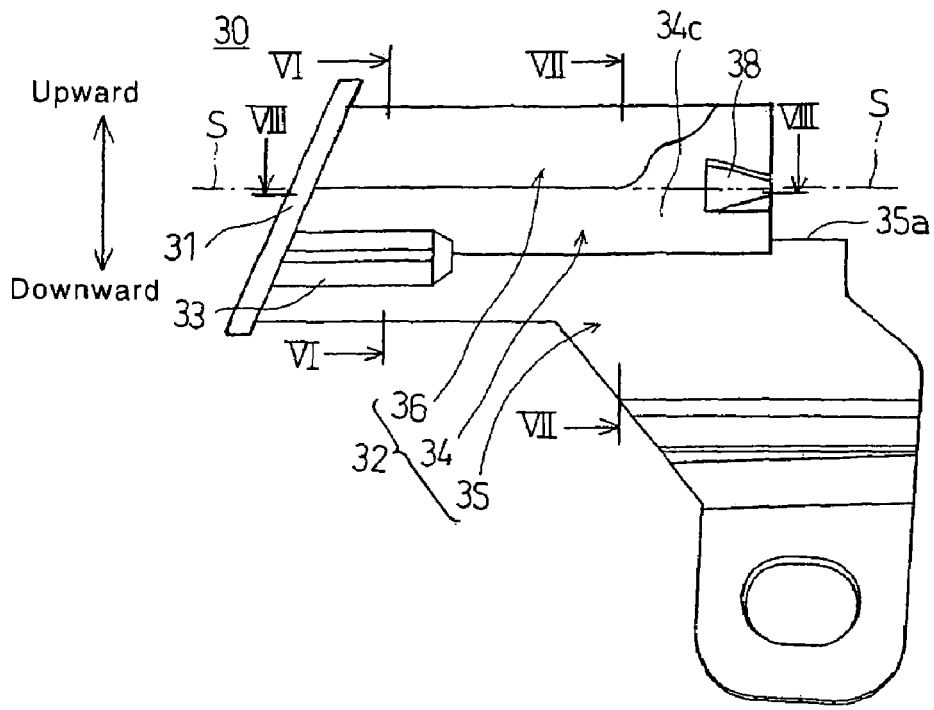
FIG. 5 is a side elevational view of the end cap shown in FIGS. 3 and 4.
Figure 6:
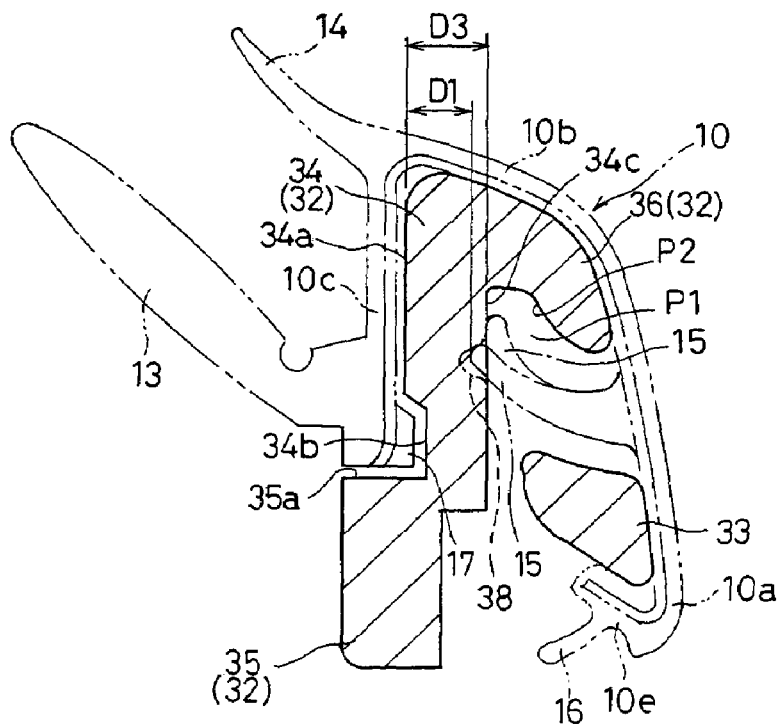
FIG. 6 is a cross sectional view taken along VI-VI line shown in FIG. 5.
Figure 7:
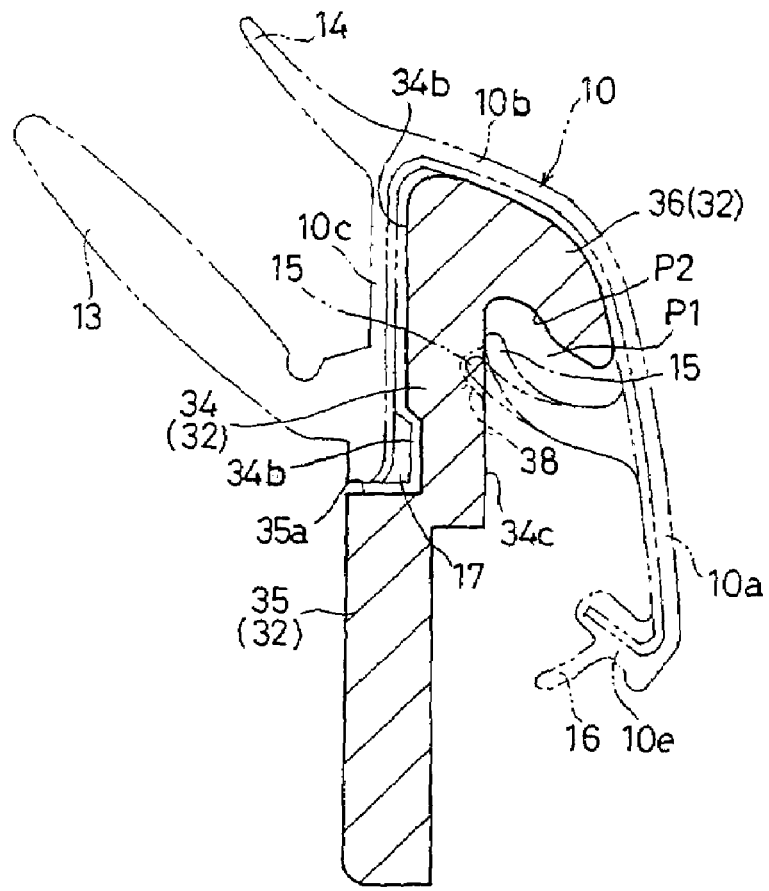
FIG. 7 is a cross sectional view taken along VII-VII line shown in FIG. 5.
Figure 8:
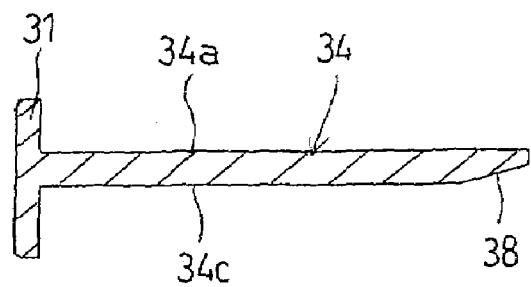
FIG. 8 is a cross sectional view taken along VIII-VIII line shown in FIG. 5.

An end cap 30 shown in FIGS. 3 through 8 is fixed to a corresponding end of the molding body 10 prior to the installation of the molding body 10 on the outer door panel 20. In FIGS. 6 and 7, each of which shows a cross sectional view of the end cap 30, the molding body 10 is shown by a phantom line (one-dot chain line or two-dot chain line). The end cap 30 is provided with an end guard portion 31 and an insertion portion (32 and 33) which projects from the end guide flat 31. The insertion portion of the end cap 30 includes a main insertion portion 32 and a sub-insertion portion 33.

The main insertion portion 32 is provided with a first flat portion 34, a second flat portion 35 and a hook portion 36 which projects from an upper end of the first flat portion 34. The first flat portion 34 and the second flat portion 35 are substantially parallel to each other, and a stepped portion is formed between the first flat portion 34 and the second flat portion 35 so that the second flat portion 35 is positioned closer to the vehicle's interior side than the first flat portion 34 as shown in FIGS. 6 and 7. The first flat portion 34 is provided on a side surface thereof with a flat adhesive surface 34a which extends along the inside wall portion 10c of the molding body 10. The first flat portion 34 is provided immediately below the adhesive surface 34a between the adhesive surface 34a and the aforementioned stepped portion with a guide groove 34b in which the guide rib 17 of the molding body 10 is slidably engaged. The second flat portion 35 is provided at an upper end thereof adjacent to the guide groove 34b with an upper surface 35a. In a state where the guide rib 17 is engaged in the guide groove 34b, the upper surface 35a is slidably engaged with the bottom end of the inside wall portion 10c. The hook portion 36 is formed on the end cap 30 as if an upper end portion of the first flat portion 34 is folded toward the outside of the vehicle, in a direction opposite to the second flat portion 35. The hook portion 36 is shaped so that an outer surface thereof is positioned along the inner surface of the second decorative flat portion 10b and a portion of the inner surface of the first decorative flat portion 10a which is adjacent to the second decorative flat portion 10b (see FIGS. 6 and 7). Namely, the main insertion portion 32 can be slidably moved relative to the molding body 10 in a lengthwise direction thereof along inner surfaces of the first decorative portion 10a, the second decorative flat portion 10b and the inside wall portion 10c in a state where the end cap 30 is fitted into the molding body 10.

The sub-insertion portion 33 has a cross sectional shape substantially corresponding to the space surrounded by the first decorative flat portion 10a, the inwardly projecting edge portion 10e and the anti-vibration lip 15. The sub-insertion portion 33 is slidably engaged with an inner surface of the inwardly projecting edge portion 10e, and a portion of the inner surface of the first decorative flat portion 10a which is adjacent to the inwardly projecting edge portion 10e (see FIG. 6). Accordingly, similar to the main insertion portion 32, the sub-insertion portion 33 can be slidably moved relative to the molding body 10 in the lengthwise direction thereof in a state where the end cap 30 is fitted into the molding body 10.

The anti-vibration lip 15 projects from a middle portion of the inner surface of the first decorative flat portion 10a between upper and lower areas of the inner surface of the first decorative flat portion 10a which are slidably engaged with the main insertion portion 32 and the sub-insertion portion 33, respectively. In other words, the inner surface of the molding body 10, except for the aforementioned middle portion thereof, serves as a supporting surface area for guiding the main insertion portion 32 and the sub-insertion portion 33 of the end cap 30 to be slidable on the molding body 10 in the lengthwise direction thereof.

As shown in FIG. 6, the wall thickness D3 of the first flat portion 34 of the end cap 30 is determined greater than the gap D1 between the tip of the anti-vibration lip 15 and an inner surface of the inside wall portion 10c. Therefore, inserting the main insertion portion 32 into the molding body 10 in the above described positional relationship therebetween causes a portion of the anti-vibration tip 15, in the vicinity of the tip thereof, to be located at the a position determined by the wall thickness D3 of the first flat portion 34 of the end cap 30 as shown by two-dot chain line in FIG. 6. The first flat portion 34 is provided, on an inner surface thereof in the vicinity of the insertion end (right end as viewed in FIG. 5) of the first flat portion 34 at a position corresponding to the position of the tip of the anti-vibration lip 15, with a deforming guide surface 38 (see FIGS. 3, 5, 6 and 7). The first flat portion 34 is provided on an outer surface thereof on the opposite surface from the flat adhesive surface 34a with a flat holding surface 34c which faces the anti-vibration lip 15. The deforming guide surface 38 is formed as a cut-out portion on the holding surface 34c in the vicinity of the insertion end of the first flat portion 34. More specifically, the deforming guide surface 38 is formed as a recess (inclined surface) in the shape of an inner surface of a substantially half truncated-cone cut in half along the insertion direction, the radius of which increases in a direction toward the end guard portion 31 (leftward as viewed in FIG. 5) from the insertion end of the first flat portion 34. Accordingly, the depth of the recess that forms the deforming guide surface 38 decreases in a direction toward the end guard portion 31 from the insertion end of the first flat portion 34, and also decreases in vertically opposite directions away from a center line S (see FIG. 5) of the first flat portion 34 extending in the lengthwise direction. The end cap 30 is provided between an inner surface of the hook portion 36 and the first flat portion 34 with a recessed portion which forms a lip-escape space P2. The lip-escape space P2 occupies a portion of the lip-escape space P1.

Figure 3:
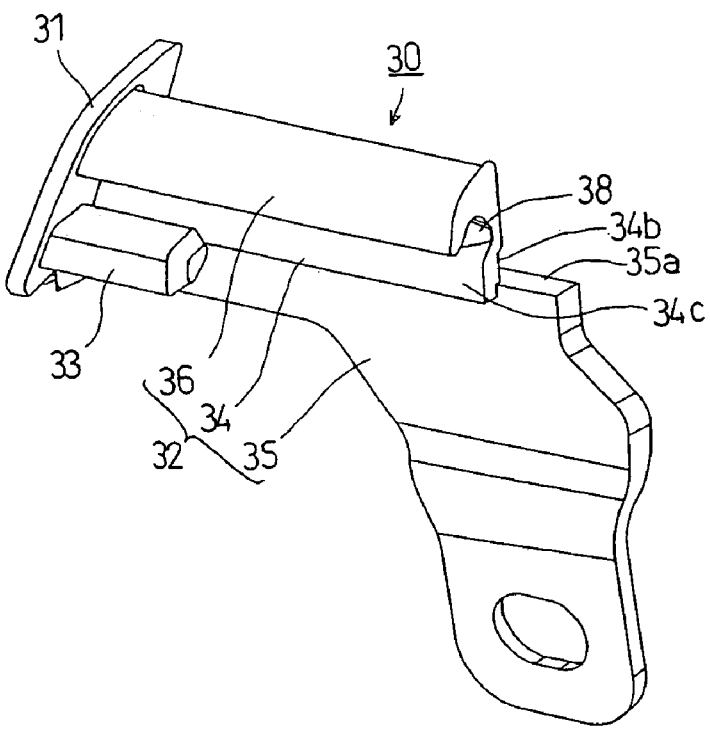
FIG. 3 is a perspective view of an end cap which serves as an element of the embodiment of the belt molding structure for motor vehicles according to the present invention, wherein the end cap is fitted into the end portion of the molding body shown in FIG. 1.

The procedure for fixing the end cap 30 to the molding body 10 will be discussed hereinafter. If the insertion ends of the first flat portion 34 and the hook portion 36 of the end cap 30 are positioned to face a corresponding end surface of the molding body 10 in a state where the guide rib 17 of the molding body 10 and the guide groove 34b of the end cap 30 are aligned in the direction of insertion of the end cap 30 into the molding body 10, the adhesive surface 34a of the first flat portion 34 is aligned with an inner surface of the inside wall portion 10c while an outer surface of the hook portion 36 is aligned with inner surfaces of the first decorative flat portion 10a and the second decorative flat portion 10b in the direction of insertion of the end cap 30 into the molding body 10. At a stage prior to the insertion of the end cap 30 into the corresponding end of the molding body 10, the anti-vibration lip 15 is in a free state as shown by two-dot chain line in FIG. 6, in which the tip of the anti-vibration lip 15 is aligned with the recess which forms the deforming guide surface 38 in the direction of insertion of the end cap 30 into the molding body 10. The amount of projection of the second flat portion 35 from the end guard portion 31 is greater than the amount of projection of the first flat portion 34 from the end guard portion 31 as shown in FIGS. 3 through 5, and accordingly the lower end of the inside wall portion 10c and the upper surface 35a of the second flat portion 35 are already in contact with each other in a state where the insertion end of the first flat portion 34 and the corresponding receiving end of the molding body 10 are properly aligned and positioned right next to each other. However, the sub-insertion portion 33 is not yet inserted into the molding body 10 in a state where the insertion end of the first flat portion 34 and the corresponding receiving end of the molding body 10 are properly aligned and positioned right next to each other because the amount of projection of the sub-insertion portion 33 from the end guard portion 31 is smaller than the amount of projection of the first flat portion 34 from the end guard portion 31 as shown in FIGS. 3 and 5.

From this state, fitting the end cap 30 into the corresponding end of the molding body 10 to a certain degree causes the adhesive surface 34a of the first flat portion 34, the upper surface 35a of the second flat portion 35 and the outer surface of the hook portion 36 to slide on the above described associated inner surfaces of the molding body 10, respectively, while the tip of the anti-vibration lip 15 comes into contact with the deforming guide surface 38. The deforming guide surface 38 is shaped to produce a component force so as to move the anti-vibration lip 15 toward the lip-escape spaces P1 and P2 in accordance with the external force which is applied to the end cap 30 in the direction of insertion thereof into the molding body 10. Accordingly, while being guided by the deforming guide surface 38, the anti-vibration lip 15 enters the lip-escape spaces P1 and P2 while being resiliently deformed to be gradually lifted upwards. This deformed state of the anti-vibration lip 15 is shown by one-dot chain line in FIGS. 6 and 7. A portion of the anti-vibration lip 15 which is passed through the deforming guide surface 38, to subsequently exit out of the recess of the deforming guide surface 38, is thereafter in pressing contact with the holding surface 34c of the first flat portion 34 so that the anti-vibration lip 15 remains deformed. Accordingly, the first flat portion 34 is pressed against the inside wall portion 10c by the resiliency of the anti-vibration lip 15 thus deformed.

Further insertion of the end cap 30 into the corresponding end of the molding body 10 beyond a certain degree causes the sub-insertion portion 33, which has a smaller amount of projection from the end guard portion 31 than the main insertion portion 32, to enter the molding body 10. The position of insertion of the sub-insertion portion 33 relative to the molding body 10 is as clearly shown in FIG. 6; an outer surface of the sub-insertion portion 33 slides on an inner surface of that portion (lower portion) of the first decorative flat portion 10a which is positioned below the anti-vibration lip 15 and an inner surface of the inwardly projecting edge portion 10e. The sliding area (the aforementioned inner surfaces of the lower portion of the first decorative flat portion 10a and the inwardly projecting edge portion 10e) between the sub-insertion portion 33 and the molding body 10 are positioned to substantially face the sliding area (inner surfaces of the inside wall portion 10c, the second decorative flat portion 10b and an upper portion of the first decorative flat portion 10a) between the main insertion portion 32 and the molding body 10. Therefore, upon the sub-insertion portion 33 being inserted into the molding body 10, the position of the end cap 30 relative to the molding body 10 in vertical and lateral directions is precisely fixed. In other words, the acceptable insertion angle of the molding body 10 for the end cap 30 in the lengthwise direction of the molding body 10 (acceptable angle of tilting of the end cap 30 relative to the molding body 10 in the lengthwise direction of the molding body 10) is increased by setting the timing of precise positioning of the end cap 30 relative to the molding body 10 in vertical and lateral directions at the end of the insertion operation of the end cap 30 into the molding body 10, which facilitates the insertion of the end cap 30 into the molding body 10.

The end cap 30 is inserted into the molding body 10 up to a point at which the end guard portion 31 comes in contact with a corresponding end surface of the molding body 10. Prior to the insertion of the end cap 30 into the corresponding end of the molding body 10, the adhesive surface 34a of the first flat portion 34 of the end cap 30 is coated with an adhesive agent to prevent the end cap 30, which is fully inserted into the molding body 10, from coming off along the lengthwise direction of the molding body 10. The adhesive agent can be applied to any other part of the end cap 30, or the end cap 30 can be prevented from coming off the molding body 10 by another method other than using an adhesive agent.

As can be understood from the above description, according to the present embodiment of the belt molding structure, the anti-vibration lip 15 does not interfere with the insertion of the end cap 30 into the molding body 10 because the end cap 30 is provided with the deforming guide surface 38 that guides the anti-vibration lip 15 to the lip-escape spaces P1 and P2 while gradually deforming the anti-vibration lip 15 in accordance with the external force which is applied to the end cap 30 in the direction of insertion thereof into the molding body 10. Therefore, not portion of the anti-vibration lip 15 has to be removed at the corresponding end of the molding body 10. Moreover, the anti-vibration lip 15 is brought into pressing contact with the flange portion 21 of the outer door panel 20 by a sufficient degree of pressure because the amount of projection of the anti-vibration lip 15 does not have to be reduced to prevent the anti-vibration lip 15 from interfering with the end cap 30, specifically with the first flat portion 34 thereof. Furthermore, the end cap 30 is prevented from rattling and tilting relative to the molding body 10 because the anti-vibration lip 15 which is resiliently deformed by the deforming guide surface 38 presses not only the flange portion 21 but also the first flat portion 34 against the inside wall portion 10c. Consequently, the present embodiment of the belt molding structure is superior in productivity since the molding body 10 does not have to be specially formed or machined for the anti-vibration lip 15, and is further superior in functionality since the anti-vibration lip 15 also serves as a device for supporting the end cap 30 with stability.

The present invention is not limited solely to the above described embodiment of the belt molding structure. Although the above described embodiment of the belt molding structure is an example of belt molding structure to which the present invention is applied, the present invention can be applied to any other type of molding structure.

Although the above described embodiment of the end cap 30 is provided with a recessed portion which forms the lip-escape space P2, the end cap does not have to be provided with such a lip-escape space if the end cap is shaped so as not to be provided with any hook portion like the hook portion 36. Namely, a minimum requirement for the belt molding structure according to the present invention is to secure an accommodation space in the molding body which is capable of accommodating the anti-vibration lip when it is deformed, and accordingly whether or not such an accommodation space for accommodating the anti-vibration lip when it is deformed is formed on the end cap is a secondary subject. In the above described embodiment of the belt molding structure, since the lip-escape space P1, which is formed in anticipation that the anti-vibration lip 15 is resiliently deformed while being in pressing contact with the flange portion 21 in the molding body 10, is secured in advance, the molding body 10 does not have to be specially shaped or machined to meet the action of deformation of the anti-vibration lip 15 which is caused by the deforming guide surface 38.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A belt molding structure for motor vehicles, comprising:
   a molding body which is attachable to an upper edge of a door panel, said molding body including a resiliently-deformable anti-vibration lip which is integrally formed on an inner surface of said molding body so as to be capable of being in resilient contact with said door panel;
   an end cap which is attachable to an end of said molding body, said end cap including an insertion portion which is inserted into said molding body from said end of said molding body;
   a lip-escape space, provided inside said molding body so as not to interfere with said insertion portion of said end cap, for allowing at least a portion of said anti-vibration lip to come into said lip-escape space when said anti-vibration lip is deformed; and
   a deforming guide surface formed on said end cap in a vicinity of an insertion end of said insertion portion to resiliently deform said anti-vibration lip into said lip-escape space in accordance with a movement of said insertion portion into said molding body when said insertion portion is inserted into said molding body;
   a holding surface on said insertion portion for holding said anti-vibration lip, which is deformed by said deforming guide surface, in a deformed state;
   said deforming guide surface and said holding surface being aligned in said insertion direction, said deforming guide surface being formed as a cut-out portion having an inclined surface, at said insertion end of said insertion portion of said end cap, so that said inclined surface terminates at said insertion end, and
   said deforming guide surface being formed as a recess in the shape of an inner surface of a substantially half truncated-cone cut in half along said insertion direction, the radius of which increases from said insertion end toward an opposite end of said insertion portion in said insertion direction.

2. The belt molding structure according to claim 1, wherein said molding body comprises at least one weather strip which comes in contact with a car window of said door panel.

3. The belt molding structure according to claim 1, wherein said lip-escape space is provided immediately above said anti-vibration lip.

4. The belt molding structure according to claim 1, wherein the depth of said recess decreases from said insertion end toward an opposite end of said insertion portion in said insertion direction.

5. The belt molding structure according to claim 1, wherein said anti-vibration lip remains in resilient contact with said holding surface in a state where said insertion portion is fully inserted into said molding body.

6. A belt molding structure for motor vehicles, comprising:
   a molding body which is attachable to an upper edge of a door panel, said molding body including a resiliently-deformable anti-vibration lip which is integrally formed on an inner surface of said molding body so as to be capable of being in resilient contact with said door panel;
   an end cap which is attachable to an end of said molding body, said end cap including an insertion portion which is inserted into said molding body from said end of said molding body;
   a lip-escape space, provided inside said molding body so as not to interfere with said insertion portion of said end cap, for allowing at least a portion of said anti-vibration lip to come into said lip-escape space when said anti-vibration lip is deformed; and
   a deforming guide surface formed on said end cap in a vicinity of an insertion end of said insertion portion to resiliently deform said anti-vibration lip into said lip-escape space in accordance with a movement of said insertion portion into said molding body when said insertion portion is inserted into said molding body;
   a holding surface on said insertion portion for holding said anti-vibration lip, which is deformed by said deforming guide surface, in a deformed state;
   said deforming guide surface and said holding surface being aligned in said insertion direction, said deforming guide surface being formed as a cut-out portion having an inclined surface, at said insertion end of said insertion portion of said end cap, so that said inclined surface terminates at said insertion end, and a recess in said deforming guide surface, the depth of said recess decreasing from said insertion end toward an opposite end of said insertion portion in said insertion direction.

7. The belt molding structure according to claim 6, wherein said deforming guide surface is formed as a recess in the shape of an inner surface of a substantially half truncated-cone cut in half along said insertion direction, the radius of which increases from said insertion end toward an opposite end of said insertion portion in said insertion direction.

8. The belt molding structure according to claim 6, wherein said molding body comprises at least one weather strip which comes in contact with a car window of said door panel.

9. The belt molding structure according to claim 6, wherein said lip-escape space is provided immediately above said anti-vibration lip.

10. The belt molding structure according to claim 6, wherein said anti-vibration lip remains in resilient contact with said holding surface in a state where said insertion portion is fully inserted into said molding body.

* * * * *